United States Patent [19]

Rasmus

[11] 4,326,759

[45] Apr. 27, 1982

[54] ANTI-FRICTION BEARING

[76] Inventor: Adam M. Rasmus, 313 Banyan Dr., Lake Worth, Fla. 33461

[21] Appl. No.: 249,074

[22] Filed: Mar. 30, 1981

[51] Int. Cl.³ .............................................. F16C 19/49
[52] U.S. Cl. .................................... 308/183; 308/200; 308/206
[58] Field of Search ............... 308/183, 200, 206, 199, 308/188, 215, 189 R

[56] References Cited

U.S. PATENT DOCUMENTS 585,909 7/1897 Collins .................................. 308/200
2,230,579 2/1941 Wintroath ............................ 308/188
3,969,005 7/1976 Traut .................................... 308/200

FOREIGN PATENT DOCUMENTS 71525 9/1915 Austria ................................. 308/200

Primary Examiner—Lenard A. Footland
Attorney, Agent, or Firm—Oltman and Flynn

[57] ABSTRACT

The present bearing has a one-piece outer race and a one-piece inner race and three concentric circular sets of bearing elements engaged between the outer and inner races at different radii from the axis of the bearing. Two of the sets of bearing elements are balls and the remaining set is made up of rollers.

15 Claims, 11 Drawing Figures

ANTI-FRICTION BEARING

SUMMARY OF THE INVENTION

This invention relates to an anti-friction bearing having concentric annular outer and inner races and three sets of concentric bearing elements engaged between the races at different positions radially outward from the central axis of rotation of the bearing.

In accordance with the present invention, the outer and inner races are one-piece bodies which define raceways which can be made concentric within a manufacturing tolerance of 0.001 inch because of the one-piece construction of each race. The outer race presents on its inside periphery one or more raceways receiving spherical balls which constitute the outer set of bearing elements in the bearing. The inner race presents on its outside periphery one or more raceways receiving spherical balls or rollers which constitute the inner set of bearing elements in the bearing. An intermediate set of bearing elements, consisting of rollers (where the inner set of bearing elements consists of balls) or balls (where the inner set of bearing elements consists of rollers), is engaged between the bearing elements of the outer and inner sets. All of the balls in the bearing are of the same radius.

In certain embodiments of this invention, concave ball raceways of circular profile axially of the bearing are provided in the outer race or in both the outer and inner races, in which case the circular radius of the raceway is larger than the radius of the balls which it receives by not more than 0.003 inch.

In other embodiments of the invention in which both the outer and inner races present cylindrical raceways and rollers constitute the intermediate bearing elements between inner and outer sets of balls, these rollers present concave raceways with a circular profile whose radius is larger than the ball radius by not more than 0.003 inch.

A principal object of this invention is to provide a novel anti-friction bearing which can be manufactured to extremely close dimensional tolerances to minimize friction in the bearing.

Further objects and advantages of this invention will be apparent from the following description of several presently preferred embodiments which are illustrated in the accompanying drawing and described in detail hereinafter.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

Figure 2:
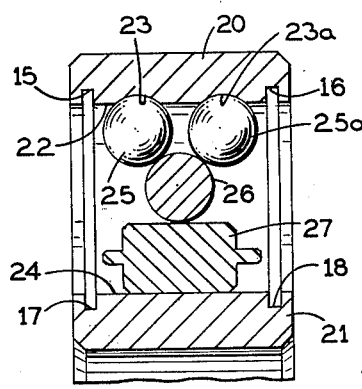
FIG. 2 is a fragmentary axial section taken along the radial line 2—2 in FIG. 1.

In the embodiment shown in FIG. 2, the bearing has an annular outer race 20 and a smaller annular inner race 21 positioned concentrically inside the outer race. The outer race 20 is a one-piece ring which presents a radially inwardly-facing, annular face 22 formed with two identical shallow concave raceways 23 and 23a which are spaced apart axially along the bearing. Each of these raceways extends circularly completely around the inside face of the outer race 20 and in axial section extends through a small fraction of an arc of a circle. The inner race 21 is a one-piece ring which presents a radially outwardly-facing, cylindrical raceway 24.

The bearing has three concentric sets of anti-friction bearing members in rolling contact with each other and with the raceways on the outer and inner races 20 and 21. The outer set of these bearing members consists of two axially spaced, circular rows of balls 25 and 25a, which engage the raceways 23 and 23a, respectively. The intermediate set of these bearing members consists of a single circular row of balls 26 positioned axially midway between the two rows of balls 25 and 25a in the outer set and in rolling engagement with them. The intermediate balls 26 are the same size as the outer balls 25 and 25a. The inner set of bearing members consists of a single circular row of cylindrical rollers 27 engaged between, and in rolling engagement with, the outwardly-facing raceway 24 on the inner race 21 and the intermediate balls 26. The radius of each roller 27 is the same as the radius of each ball 26, 25 and 25a.

Near the opposite ends of the bearing the outer race 20 is formed with internal annular grooves 15 and 16 and the inner race 21 is formed with external annular grooves 17 and 18 which are aligned respectively with grooves 15 and 16 to receive snap-ring retainer plates.

In accordance with the present invention, each of the races 20 and 21 is a one-piece body. Each concave raceway 23 and 23a in the outer race 20 is a single continuous surface which is case hardened and finish ground and polished to at least a No. 12 microfinish. This is also true of the cylindrical raceway 24 defined by the outside surface of the inner race 21. The respective raceways in the outer and inner races are concentric within a tolerance of not substantially greater than 0.001 inch. The axial profile of each concave raceway 23 and 23a in the outer race 20 has a circular radius which is not more than substantially 0.003 inch greater than the radius of the corresponding outer balls 25 and 25a which they receive.

Figure 1:
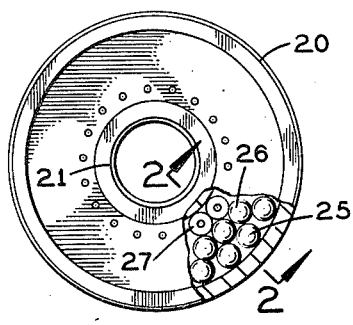
FIG. 1 is an axial end view of a first embodiment of this invention, partly broken away for clarity.
Figure 3:
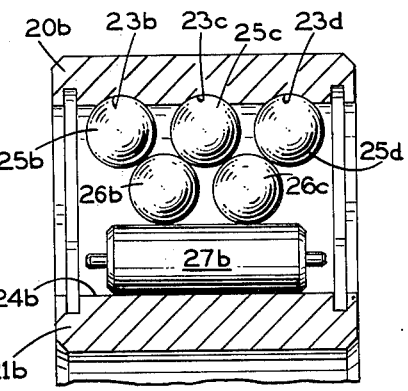
FIG. 3 is a similar view of a second embodiment of the invention.

FIG. 3 shows a second embodiment of the present invention which is essentially similar to the embodiment of FIGS. 1 and 2 except that its outer race 20b is formed with three concave raceways 23b, 23c, and 23d, its outer set of bearing balls is made up of three axially spaced, circular rows of balls 25b, 25c and 25d, and its intermediate set of bearing balls is made up of two axially spaced, circular rows of balls 26b and 26c. The inner set of bearing elements consists of a single group of circularly arranged rollers 27b engaged between the cylindrical raceway 24b on the inner race 21b and both rows of balls 26b and 26c which form the intermediate set of bearing elements in this bearing.

Figure 4:
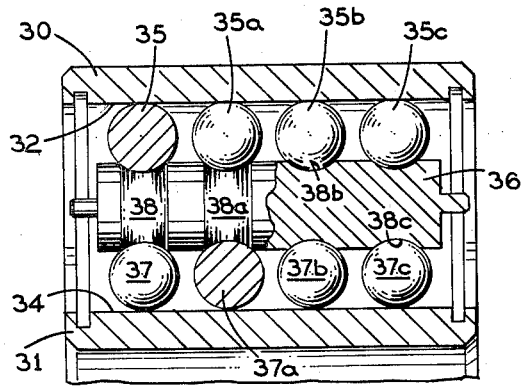
FIG. 4 is a similar view of a third embodiment.

In the embodiment of the invention shown in FIG. 4 the outer race 30 presents a single, inwardly-facing, cylindrical raceway 32. The outer set of bearing elements consists of four axially spaced, circular rows of identical balls 35, 35a, 35b and 35c, all of which are in rolling engagement with the raceway 32 on the outer race. The inner race 31 presents a single, outwardly-facing cylindrical raceway 34. The inner set of bearing elements consists of four axially-spaced, circular rows of identical balls 37, 37a, 37b and 37c, which are radially aligned respectively with the outer rows of balls 35, 35a, 35b and 35c. The intermediate set of bearing elements consists of a single circular group of rollers 36, each of which is formed with four axially-spaced, shallow, concave peripheral grooves 38, 38a, 38b and 38c, each having a circular profile axially of the bearing. The radially aligned balls 35 and 37 engage in the groove 38 in each roller, the radially aligned balls 35a and 37a engage in the groove 38a in each roller, the radially aligned balls 35b and 37b engage in the groove 38b in each roller, and the radially aligned balls 35c and 37c engage in the groove 38c in each roller. Each roller groove 38, 38a, 38b and 38c defines an intermediate raceway for the respective balls and it is formed as described for the raceways 23 and 23a in the outer race in FIG. 2. The circular radius of each roller groove axially of the bearing exceeds the ball radius by not more than substantially 0.003 inch.

Figure 5:
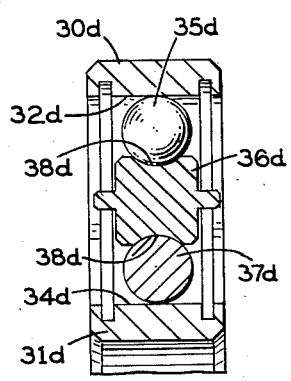
FIG. 5 is a similar view of a fourth embodiment.

The embodiment of FIG. 5 is basically similar to that of FIG. 4 except that each roller 36d has a single concave groove 38d in its periphery, the set of outer bearing elements consists of a single circular row of balls 35d, and the set of inner bearing elements consists of a single circular row of balls 37d. The outer and inner sets of balls 35d and 37d engage in the single groove 38d in each of the rollers 36d.

Figure 6:
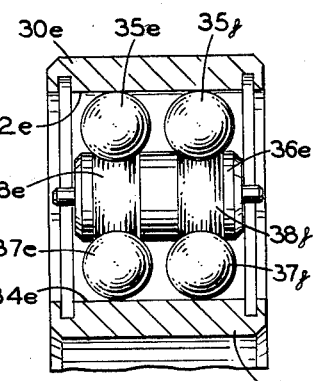
FIG. 6 is a similar view of a fifth embodiment.

FIG. 6 shows a basically similar arrangement in which two axially spaced, circular rows of balls 35e and 35f make up the outer set of bearing elements, two axially spaced, circular rows of balls 37e and 37f make up the inner set of bearing elements, and each of the rollers 36e engaged between these balls is formed on its periphery with two circular grooves 38e and 38f which receive the balls.

Figure 7:
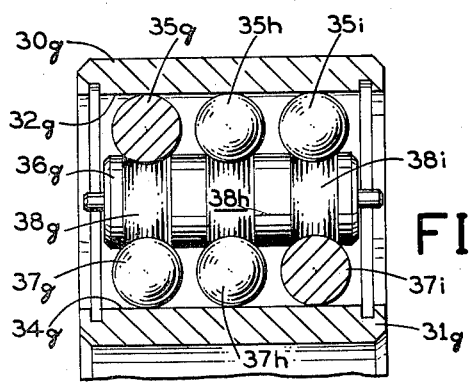
FIG. 7 is a similar view of a sixth embodiment.
Figure 8:
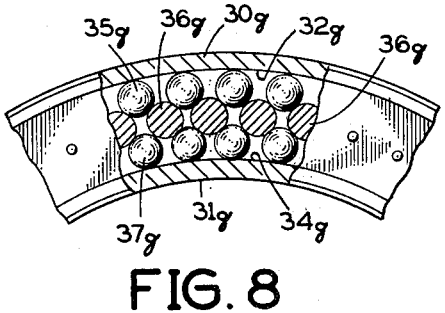
FIG. 8 is a fragmentary end view of the bearing shown in FIG. 7, partly broken away for clarity.

FIGS. 7 and 8 show another arrangement basically similar to FIGS. 4, 5 and 6 except that it has three axially spaced, circular rows of balls 35g, 35h and 35i constituting the outer set of bearing elements, three axially spaced, circular rows of balls 37g, 37h and 37i constituting the inner set of bearing elements, and a circular group of rollers 36g engaged between the outer and inner balls and formed with three circular grooves 38g, 38h and 38i which receive the outer and inner balls 35g and 37g, 35h and 37h, and 35i and 37i, respectively.

Figure 9:
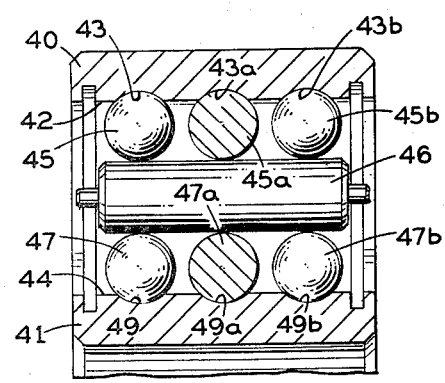
FIG. 9 is a fragmentary axial sectional view of a seventh embodiment of the present bearing.

FIG. 9 shows yet another embodiment of the present bearing which has three axially spaced, circular rows of balls 45, 45a and 45b making up the outer set of bearing elements, and three axially spaced, circular rows of balls 47, 47a and 47b making up the inner set of bearing elements. All of the balls are identical. The intermediate set of bearing elements is made up of a single circular group of cylindrical rollers 46 engaged between all of the outer balls 45, 45a and 45b and all of the inner balls 47, 47a and 47b. The outer race 40 is formed with three axially-spaced, inwardly-facing, circular grooves 43, 43a and 43b which define its raceways engaging the outer rows of balls 45, 45a and 45b, respectively. The inner race 41 is formed with three axially-spaced, outwardly-facing, circular grooves 49, 49a and 49b which define its raceways engaging the inner rows of balls 47, 47a and 47b, respectively. The groove 43 in the outer race 40 is aligned axially and is concentric with the groove 49 in the inner race. This is also true of grooves 43a and 49a, and grooves 43b and 49b. The radius of the arc of curvature of each groove in the outer and inner races axially of the bearing exceeds the ball radius by not more than 0.003 inch.

Figure 10:
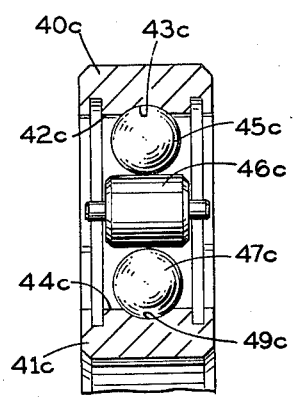
FIG. 10 is a similar view of an eighth embodiment.

The embodiment of FIG. 10 is basically similar to that of FIG. 9 except that it has a single concave raceway 43c in the outer race 40c, a single row of outer balls 45c in rolling engagement with this raceway and with the cylindrical periphery of roller 46c, a single concave raceway 49c in the inner race 41c, and a single row of inner balls 47c in rolling engagement with the inner raceway 49c and with the intermediate rollers 46c.

Figure 11:
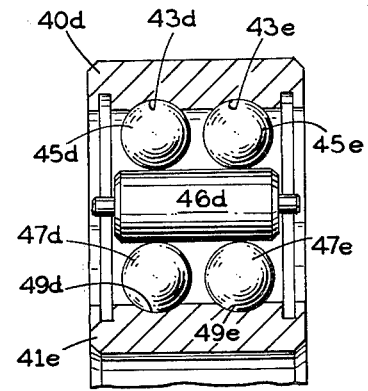
FIG. 11 is a similar view of a ninth embodiment.

FIG. 11 shows still another embodiment which is basically similar to the embodiments of FIGS. 9 and 10 except that it has two concave raceways 43d and 43e in its outer race 40d, two rows of outer balls 45d and 45e engaged between these raceways and the cylindrical intermediate rollers 46d, two concave raceways 49d and 49e in its inner race 41e, and two rows of inner balls 47d and 47e engaged between the cylindrical intermediate rollers 46d and the inner raceways 49d and 49e, respectively.

In each of these embodiments, the present bearing incorporates precisely sized balls and rollers which provide minimum frictional resistance to relative rotation between the outer and inner races. Each of the bearing races is of one-piece construction which facilitates the minimizing of frictional losses in the bearing. No bearing retainer cages, which would add friction, are present in this bearing but instead the bearing elements of the three sets, two of which are balls and the third rollers, determine one another's circumferential positions in the bearing without creating excessive friction.

I claim:

1. In an anti-friction bearing having concentric outer and inner races which define radially inwardly-facing and radially outwardly-facing circular raceways, respectively, the improvement which comprises:

three concentric sets of anti-friction bearing members engaged in succession radially between said races in rolling contact with said raceways and with each other, two of said sets of bearing members consisting of balls and the remaining set consisting of rollers, each of said rollers being unsupported except where it has said rolling contact with balls or a raceway;

each of said races being a one-piece annular body, and each of said raceways being a single continuous surface that is case hardened and finish ground and polished to at least a No. 12 microfinish, and the respective raceways of said outer and inner races being concentric with a tolerance not greater than substantially 0.001 inch.

2. A bearing according to claim 1, wherein said three sets of bearing members consist of an inner set of balls engaging the inner race, an outer set of balls engaging the outer race, and a set of rollers engaged between the inner and outer sets of balls and supported entirely by them.

3. A bearing according to claim 2, wherein each of said rollers has a circular groove in its periphery engaging balls of the outer and inner sets, and said raceways on the outer and inner races are cylindrical.

4. A bearing according to claim 3, wherein the inner set of balls consists of a single row of balls, and the outer set of balls consists of a single row of balls aligned radially with the row of balls of the inner set.

5. A bearing according to claim 3, wherein the inner set of balls consists of a plurality of rows of balls spaced apart axially of the bearing, the outer set of balls consists of a similar plurality of rows of balls aligned radially with the respective rows of balls of the inner set, and each roller has grooves aligned radially with the respective rows of balls of the outer and inner sets.

6. In an anti-friction bearing having concentric outer and inner races which define radially inwardly-facing and radially outwardly-facing circular raceways, respectively, and three concentric sets of anti-friction bearing members engaged in succession radially between said races in rolling contact with said raceways and with each other, two of said sets of bearing members consisting of balls and the remaining set consisting of rollers, the improvement wherein:
said set of rollers engages the outwardly-facing raceway on the inner race;
each of said races is a one-piece annular body;
and each of said raceways is a single continuous surface that is case hardened and finish ground and polished to at least a No. 12 microfinish, and the respective raceways of said outer and inner races are concentric within a tolerance not greater than substantially 0.001 inch.

7. A bearing according to claim 6, wherein said rollers have cylindrical surfaces in rolling contact with the outwardly-facing raceway on the inner race and the adjacent set of balls.

8. A bearing according to claim 7, wherein said adjacent set of balls consists of a single circular row of balls, and the remaining set of balls consists of two circular rows of balls located axially on opposite sides of said single row of balls and in rolling engagement with said single row of balls and with the inwardly-facing raceway on said outer race.

9. A bearing according to claim 8, wherein said outer race presents two grooves with a circular profile axially of the bearing which define inwardly-facing raceways respectively engaging said two circular rows of balls.

10. A bearing according to claim 7, wherein said adjacent set of balls has two circular rows of balls spaced apart axially of the bearing, and the remaining set of balls has three circular rows of balls spaced apart axially in succession on opposite sides of said two circular rows of balls and in rolling engagement with said two rows of balls and with the inwardly-facing raceway on said outer race.

11. A bearing according to claim 10, wherein said outer race presents three grooves with a circular profile axially of the bearing which define inwardly-facing raceways respectively engaging said three circular rows of balls.

12. A bearing according to claim 6, wherein said outer race presents axially spaced grooves with a circular profile axially of the bearing which define inwardly-facing raceways respectively engaging the balls of the set closest to the outer race.

13. In an anti-friction bearing having concentric outer and inner races which define radially inwardly-facing and radially outwardly-facing circular raceways, respectively, and three concentric sets of anti-friction bearing members engaged in succession radially between said races in rolling contact with said raceways and with each other and consisting of an inner set of balls engaging the inner race, an outer set of balls engaging the outer race, and a set of rollers engaged between the inner and outer sets of balls, the improvement wherein:
each of said races is a one-piece annular body;
each of said raceways is a single continuous surface that is case hardened and finish ground and polished to at least a No. 12 microfinish, and the respective raceways of said outer and inner races are concentric within a tolerance not greater than substantially 0.001 inch;
said raceways on the outer and inner races are defined by grooves with a circular profile axially of the bearing which are aligned radially and engage the balls of the outer and inner sets, respectively;
and said rollers have cylindrical peripheries engaging the balls of the outer and inner sets.

14. A bearing according to claim 13, wherein the inner set of balls consists of a single row of balls, and the outer set of balls consists of a single row of balls aligned radially with the row of balls of the inner set.

15. A bearing according to claim 13, wherein the inner set of balls consists of a plurality of rows of balls spaced apart axially of the bearing, and the outer set of balls consists of a similar plurality of rows of balls aligned radially with the respective rows of balls of the inner set.

* * * * *